(12) United States Patent
Rova

(10) Patent No.: US 7,293,634 B2
(45) Date of Patent: Nov. 13, 2007

(54) HYDRAULIC VEHICLE SHOCK ABSORBER

(75) Inventor: Jan-Erik Rova, Kiruna (SE)

(73) Assignee: ASA-Suspension AB, Kiruna (SE)

( * ) Notice: Subject to any disclaimer, the term of this patent is extended or adjusted under 35 U.S.C. 154(b) by 78 days.

(21) Appl. No.: 10/520,351

(22) PCT Filed: Jul. 12, 2002

(86) PCT No.: PCT/SE02/01382

§ 371 (c)(1),
(2), (4) Date: Sep. 2, 2005

(87) PCT Pub. No.: WO2004/018896

PCT Pub. Date: Mar. 4, 2004

(65) Prior Publication Data

US 2006/0151271 A1    Jul. 13, 2006

(51) Int. Cl.
*F16F 9/50* (2006.01)
(52) U.S. Cl. ................... 188/281; 188/322.22
(58) Field of Classification Search ........... 188/322.22, 188/322.15, 322.18, 281, 316, 317
See application file for complete search history.

(56) References Cited

U.S. PATENT DOCUMENTS 2,912,069 A * 11/1959 Dillenburger ............ 188/282.5
4,415,146 A * 11/1983 Sitko ........................... 267/96
2002/0070085 A1  6/2002 Adamek et al.

FOREIGN PATENT DOCUMENTS

| | | |
|---|---|---|
| DE | 19642806 C1 | 10/1996 |
| EP | 0 195 150 A1 | 9/1986 |
| EP | 0 292 881 | 11/1988 |
| FR | 1 077 611 | 11/1954 |
| FR | 1 101 872 | 10/1955 |
| FR | 2 493 443 | 7/1982 |
| LU | 33 116 | 11/1954 |

* cited by examiner

*Primary Examiner*—Robert A. Siconolfi
*Assistant Examiner*—Vu Q. Nguyen
(74) *Attorney, Agent, or Firm*—Dickstein Shapiro LLP

(57) ABSTRACT

A hydraulic shock absorber comprises a cylindrical chamber (3), which is closed at one end and in which is axially slidably guided a piston member 85), supported by a piston rod (8) and at its peripheral surface carrying a surrounding non-slotted elastic ring element (6), the peripheral piston member surface being conically converging in a direction away from the closed chamber end and the inner surface of the ring element also conically converging in the same direction, the ring element (6) furthermore being axially reciprocably mounted on the piston member (5) between a first rigid abutment 84) at the end of said member (5) closest to the closed and (10) of the chamber (3), and a second rigid abutment (7) on the piston member (5) at a spacing from the first abutment (4) exceeding the axial length of the ring element (6). In order to increase the speed of response of the absorber the invention suggests that the two conical surfaces have mutually different conicity with core angles and diameters such selected that in an outward return movement of the piston member (5) the same is urged with its steeper conical peripheral surface against the less conical inner surface of the surrounding ring element (6) and brings the first abutment (4) into engagement with yieldable ring element (6) while—at the same time—radially expanding the same so as to leave only a small intentional clearance for letting through hydraulic fluid between the outer surface of the ring element (6) and the inner surface of the cylinder.

7 Claims, 2 Drawing Sheets

HYDRAULIC VEHICLE SHOCK ABSORBER

BACKGROUND OF THE INVENTION

The present invention refers to an improved hydraulic vehicle shock absorber intended to provide an optimum damping action only when there is a real need thereof and then to a well controlled level. In fact, a hydraulic vehicle shock absorber according to the invention comprises a cylindrical chamber which is closed at one end and in which is axially slidably guided a piston member supported by a piston rod and at its peripheral surface carrying a surrounding non-slotted elastic ring element, the peripheral piston member surface being conically converging in a directional wave from the closed chamber end and the inner surface of the ring element also conically converging in the same direction, the ring element furthermore being axially slidably mounted on the piston member between a first rigid abutment at the end of a said member closest to the closed end of the chamber and a second rigid abutment on the piston member at a spacing from the first abutment exceeding the axial length of the ring element.

Motion or shock absorber designs with co-operating conical surfaces are known in several connections. Thus DE 196 42 806 C1 shows such a design with a co-operating conical surfaces in connection with a pneumatic motion damper for e.g. a glove compartment lid. On a piston with conical outer surface slidably guided in a cylinder is carried a correspondingly conical sleeve like sealing being slightly axially movable on the piston and on its auto-surface having a sealing collar engaging the surrounding cylinder wall. The damping or absorbing fluid, in the present case air, therefore can not pass between the sealing sleeve and in the cylinder wall but only through a restricted channel in the conical surfaces when the same are engaging each other during the piston rod movement out of the cylinder. In the opposite motion direction of the piston the mutual engagement of the conical surfaces is stopped very rapidly due to the material stresses in the ring element and a greater cross sectional area is made free to the absorbing fluid. Mutually co-operating conical surface also may be used to provide in a cylindrical chamber a suitable bearing force against the cylinder wall and in this manner by friction to provide a damping action on a motion, such as described in FR A 1 077 611. U.S. Pat. No. 2,912,069 describes how an elastic insert body provided with a conical surface may serve as a valve member in a shock absorber structure in order to make the shock absorber more silent in operation. EP 0 198 A2 describes a piston- and ring-arrangement in a shock-absorber design in order to provide for as few parts as possible, namely two. Finally, FR A 2 493 443 shows mutually co-operating conical surfaces which provides for the expansion of a break means creating a friction force against a cylinder wall.

Most of the present vehicle shock absorber structures of hydraulical type usually comprise a piston member carried by a piston rod and provided with central penetrating bores or channels with a plurality of valve means and spring means. A drawback of such structures is that they necessarily show a non-unessential time lag in their operation as the same time as the fluid or oil passing through the piston becomes heavily agitated which leads to the formation of foam and generation of heat. Said generation of heat in its turn leads to changes of the viscosity of the absorbing fluid and therefore cooling measures often are required. In motor-cycles and particularly in snow mobiles there occurs an inconvenient phenomenon in the form of so-called memory action of the shock absorbers. If for instance the front steering skis of the snow mobiles are mounted in spring struts provided with shock absorbers it is essential that the damping of the outward movement of the spring strut after a compression occurs distinctly but extremely fast since otherwise in a new closely following compression spring movement the shock absorber has not yet allowed the spring strut to extend completely. In a plurality of such compressions of the spring strut following closely after each other in a regularly uneven path or the like in various types of country driving, the spring strut finally may stop into a completely compressed position and thus act as being fully rigid. Since it is important that the spring absorbs most of the impact force against a obstacle, the shock absorbing or damping action usually is selected small at the compression movement, to a magnitude of about 10%, while a shock absorbing or damping action of about 90% is desired at the movement outwardly. The shock absorber according to the invention may also advantageously be used in most other vehicles than the above-stated.

BRIEF SUMMARY OF THE INVENTION

Now the present invention aims that providing a sensing or active shock absorbing structure the action of which adapts itself to after the need of damping. According to the invention this is obtained substantially in that the two conical surfaces are formed with mutually different conicity with cone angles and diameters such selected that in an outward return movement of the piston member the same is urged with its steeper conical peripheral surface against the less conical inner surface of the surrounding ring element and brings the first abutment into engagement with the yieldable ring element while—at the same time—radially expanding the same so as to leave only a small intentional clearance for letting through hydraulic fluid between the outer surface of the ring element and the inner surface of the cylinder.

Besides the activation operation of the shock absorber according to the invention thus mentioned the same also provides a much smaller agitation action on the hydraulic fluid—also by shorter periods of action—and owing to the fact that the fluid passes closest to the cylinder wall said fluid may easily be cooled in an advantageous way. Prior shock absorber designs often have had a constant absorbing or damping action due to the design but the absorber according to the invention may better be called active in its operation since its function changes after the needs. The ring element namely will expand and hence reduce the through-flow area of the hydraulic fluid due to the magnitude of the liquid pressure which occurs by the speed of the fluid, thus a sensing action. The expansion of the ring element provided for by the co-operation of the conical surfaces may provide very great forces in this element by only small axial movements between the piston member and the ring element and hence also a very fast return to the released position with fully exposed cross sectional area.

BRIEF DESCRIPTION OF THE DRAWINGS

By way of example the invention will be further described below with reference to the accompanying drawing in which.

DETAILED DESCRIPTION OF THE INVENTION

Figure 1:
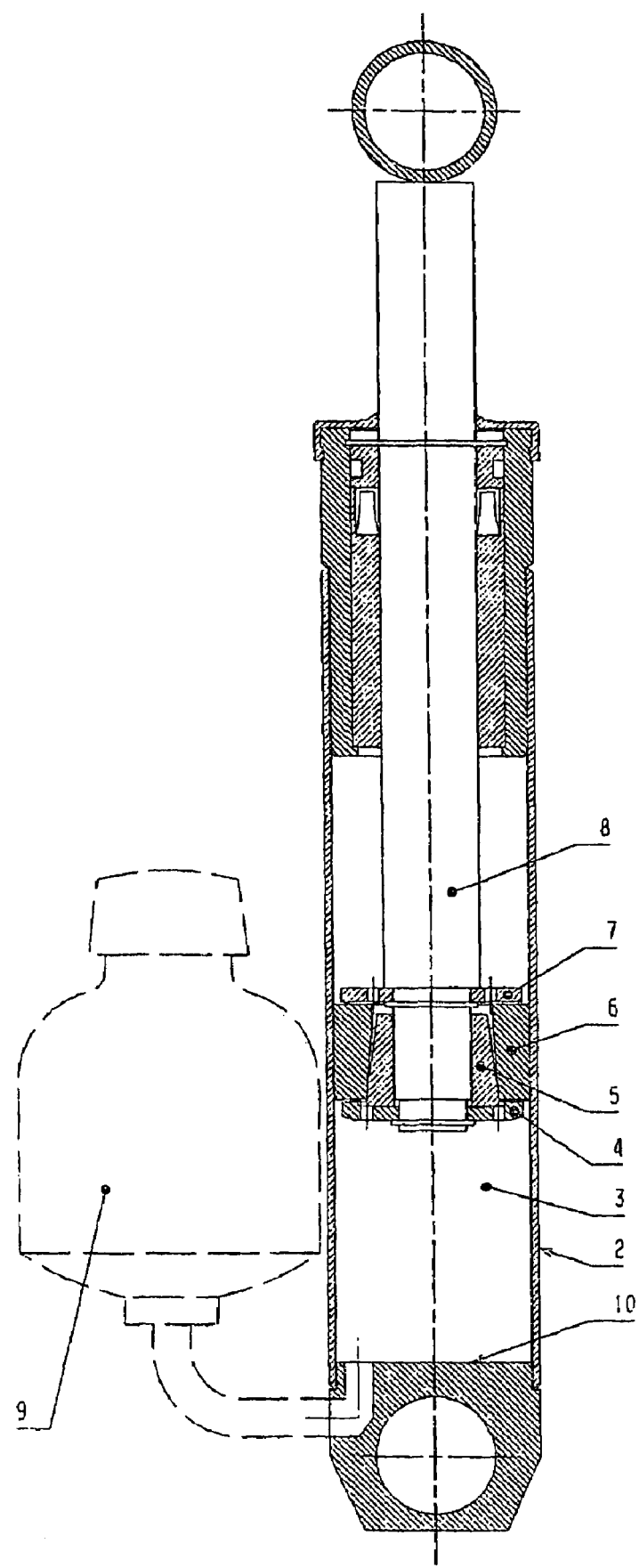
FIG. 1 illustrates a longitudinal section through an inventive shock absorber and FIGS. 2a and b show sectional detail views to an enlarged scale of the ring element and the piston member in non-active and in active shock absorbing position, respectively.

In the drawing it is thus illustrated a shock absorber according to the invention comprising an extended cylinder 2 in which is slidably guided a piston 5 carried by a piston rod 8. Externally the piston 5 is surrounded by a non-slotted ring 6 and the latter is mounted longitudinally slidable between a first end abutment 4 on the piston rod 8 at the end closest to the closed cylinder end 10 and a second abutment 7 located at an axial distance on the piston rod from the end of abutment 4 greater than the axial length of the piston 5.

Within the cylinder 2 the piston 5 restricts a chamber 3 and as known the cylinder is filled with hydraulic fluid. According to the invention the peripheral surface of the piston 5 is made conically converging in the direction from the closed cylinder end 10, while the surrounding ring 6 in a similar way is internally conically converging in the same direction. The conical angle $\alpha_2$ of the peripheral surface of the piston 5 is, however, greater than the conical angle $\alpha_1$ of the inner surface of the ring 6 for a purpose to be further described below.

Figure 2:
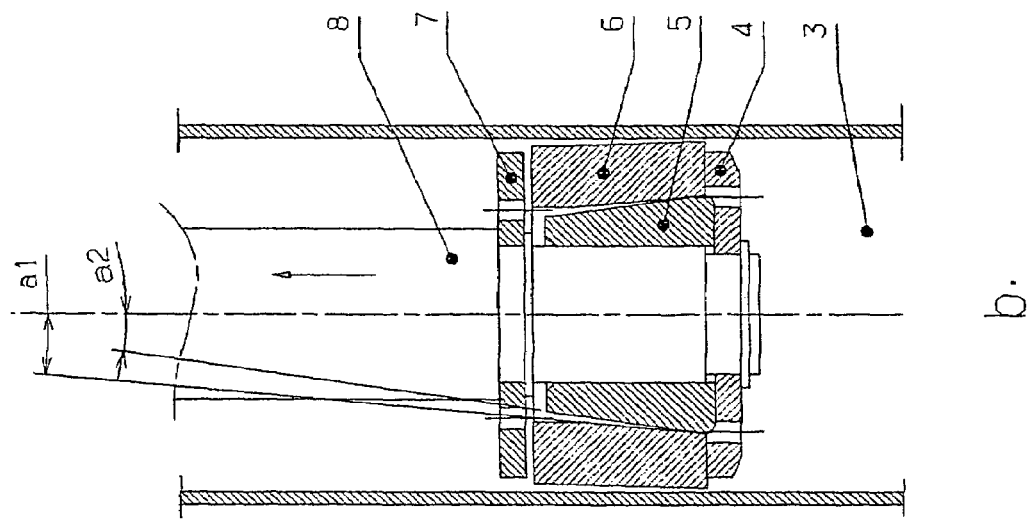
Figure 2:
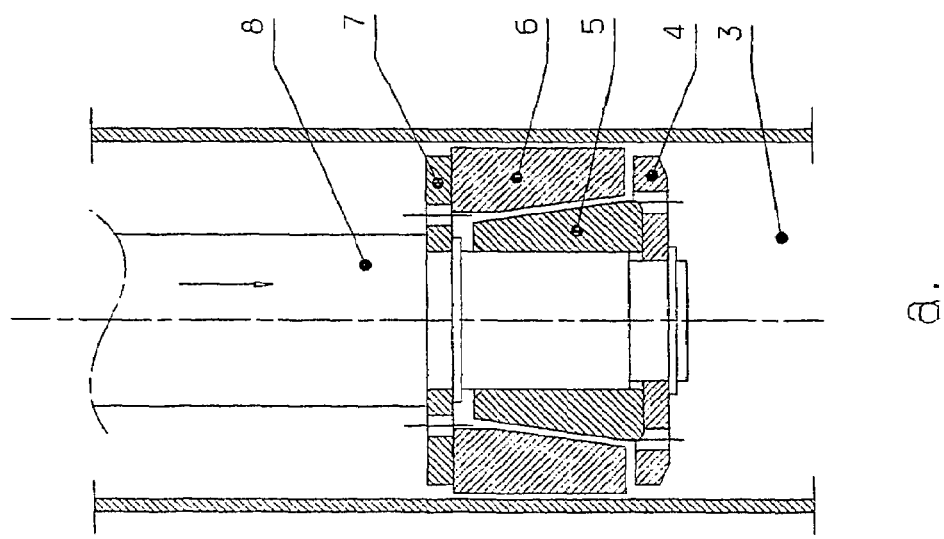

In a compression of the spring member co-operating with the shock absorber the piston 5 and the ring 6 are together with the piston rod 8 urged inwardly in the cylinder 2 thereby letting the hydraulic fluid in the chamber 3 flow both between the conical surfaces and between the outer surface of the ring 6 and the surrounding cylinder wall such as illustrated in FIG. 2a. The shock absorbing action aimed at in the normal case in such a compression of the shock absorber amounts in this case to about 10% and may easily be obtained by suitable dimensioning of the piston 5 and the ring 6 as well as the cylinder 2.

In a return movement of the non-illustrated spring member, such as illustrated in FIG. 2b, with accompanying extraction of the piston rod 8 out of the cylinder 2, which rapidly and with a very great force since the spring compression has accumulated the force of the spring movement, the abutment 4 carries the piston 5 axially with its conical surface into the internal conical surface of the surrounding ring 6 during simultaneous radial expansion of the resilient ring 6. However, the latter is such dimensioned in its outer diameter that it will not come into engagement with the inner surface of the surrounding cylinder 2 but leave a small clearance at this wall for the hydraulic fluid to pass through. Owing to this, the action of the shock absorber will not be fully stiff but shock absorbing or damping action will be achieved suitably amounting to about 90%.

This condition of the shock absorber will reside only under a very short moment when the return force of the spring means is at maximum but in the next moment the two co-operating conical surfaces of the piston 5 and ring 6 will cause that the latter leaves its expanded position under axial movement relative piston 5 and a rapidly increasing area will again be made free for the passage of the hydraulic fluid passed the piston 5.

According to the invention the surrounding ring 6 is resilient and even if the ring 6 might be made of the same or a similar material as the piston 5 and thus has substantially the same modulus of elasticity as the latter, it is advantageous for the distinct operation of the shock absorber that the ring material has much lower modulus of elasticity, probably of one order of magnitude less than the piston material. By this an extremely fast operation of the damping and valve function of the piston and ring unit will be assured. As piston material steel might primarily be selected but also brass and hard plastics. The ring 6 suitably is made of plastic. Practical tests have disclosed that it is suitable that the conical angle $\alpha_2$ of the outer surface of the piston 5 is of the magnitude of about 8° while the conical angle $\alpha_1$ of the internal surface of the ring 6 amounts about 5°.

A preferred embodiment of the invention also comprises an axial adjustability in the co-operation between the two conical surfaces of the piston 5 and ring 6. Advantageously, this may be carried out from the exterior of the shock absorber, for instance by connecting the piston with a piston rod 8 and guiding the ring 6 axially and non-rotatably within the cylinder. Through said piston rod or alternatively by means of an adjustment member mounted therein axial adjustments of the piston 5 relative the ring 6 are made possible. Thereby the conical surface of the piston 5 might be axially adjusted and more or less exposed to the conical surface of the expanding ring 6.

In the above-stated the shock absorber according to the invention has being stated as being a separate unit for co-operation in a known manner with a leaf spring, torsion spring or helical spring in a vehicle wheel suspension or the like. However, it is also possible to integrate the shock absorber with the spring means by connecting the shock absorber chamber 3 with a gas chamber 9 as indicated with dotted lines in FIG. 1 of drawing.

Finally it is also to be emphasized that even if the invention in the above-stated primarily has been described as applied to snow mobiles and motorcycles, practical tests have shown that the inventive structure also advantageously may be applied to cars such as in rear axle suspensions.

I claim:

1. A hydraulic shock absorber comprising a cylindrical chamber (3), which is closed at one end and in which is axially slidably guided a piston member (5), supported by a piston rod (8) and at a peripheral surface of the piston member (5) carrying a surrounding non-slotted elastic ring element (6), the peripheral surface of the piston member (5) being conically converging in a direction away from the closed chamber end and the inner surface of the ring element also conically converging in the same direction, the ring element (6) furthermore being axially reciprocably mounted on the piston member (5) between a first rigid abutment (4) at the end of said member (5) closest to the closed end (10) of the chamber (3), and a second rigid abutment (7) on the piston member (5) at a spacing from the first abutment (4) exceeding the axial length of the ring element (6), characterized in that the two conical surfaces have mutually different conicity with core angles and diameters such selected that in an outward return movement of the piston member (5), the piston member (5) and the steeper conical peripheral surface of the piston member (5) are urged against the less conical inner surface of the surrounding ring element (6) and bring the first abutment (4) into engagement with the yieldable ring element (6) while, at the same time, radially expanding the ring element (6) so as to leave only a small intentional clearance for letting through hydraulic fluid between the outer surface of the ring element (6) and the inner surface of the cylindrical chamber.

2. A shock absorber according to claim 1, characterized in that the external surface of the piston member (5) has a conical angle of about 8° while the internal surface of the ring element (6) has a conical angle of about 5°.

3. A shock absorber according to claim 1, characterized in that the modulus of elasticity of the material of the piston member (5) is greater than that of the material of the ring element (6).

4. A shock absorber according to claim 1, characterized in that piston member (5) is made of metal while the ring element (6) is made of plastic.

5. A shock absorber according to claim 4, wherein the piston member (5) is made of steel.

6. A shock absorber according to claim 4, wherein the piston member (5) is made of brass.

7. A shock absorber according to claim 1, characterized in that piston member (5) is made of hard plastic while the ring element (6) is made of plastic.

* * * * *